United States Patent
Lisberger et al.

(10) Patent No.: US 9,957,195 B2
(45) Date of Patent: May 1, 2018

(54) PROCESS AND DEVICE FOR SEPARATING OFF A VOLATILE COMPONENT

(71) Applicants: SCHEUCH GMBH, Aurolzmuenster (AT); W & P ZEMENT GMBH, Klein St. Paul (AT); A TEC HOLDING GMBH, Krems (AT)

(72) Inventors: Manfred Lisberger, Riedau (AT); Andreas Steinwandter, Ried im Innkreis (AT); Peter Schwei, Faak am See (AT); Wolfgang Freimann, Leoben (AT)

(73) Assignees: Scheuch GmbH, Aurolzmuenster (AT); W&P Zement GmbH, Klein St. Paul (AT); A Tec Holding GmbH, Krems (AT)

(*) Notice: Subject to any disclaimer, the term of this patent is extended or adjusted under 35 U.S.C. 154(b) by 443 days.

(21) Appl. No.: 14/426,212

(22) PCT Filed: Sep. 5, 2013

(86) PCT No.: PCT/AT2013/050173
§ 371 (c)(1),
(2) Date: Mar. 5, 2015

(87) PCT Pub. No.: WO2014/036585
PCT Pub. Date: Mar. 13, 2014

(65) Prior Publication Data
US 2015/0225292 A1 Aug. 13, 2015

(30) Foreign Application Priority Data
Sep. 5, 2012 (AT) .............................. A 50359/2012

(51) Int. Cl.
*C04B 7/36* (2006.01)
*C04B 7/43* (2006.01)

(52) U.S. Cl.
CPC .............. *C04B 7/364* (2013.01); *C04B 7/432* (2013.01); *C04B 7/436* (2013.01); *Y02P 40/121* (2015.11)

(58) Field of Classification Search
CPC .......... C04B 7/364; C04B 7/432; C04B 7/436
See application file for complete search history.

(56) References Cited

U.S. PATENT DOCUMENTS

| | | | | |
|---|---|---|---|---|
| 3,938,949 A | * | 2/1976 | Christiansen | F27B 7/20 432/106 |
| 3,973,980 A | * | 8/1976 | Rohrbach | C04B 7/43 106/750 |

(Continued)

FOREIGN PATENT DOCUMENTS

| | | |
|---|---|---|
| CN | 1418178 A | 5/2003 |
| CN | 1789194 A | 6/2006 |

(Continued)

*Primary Examiner* — Nathaniel Herzfeld
(74) *Attorney, Agent, or Firm* — Laurence A. Greenberg; Werner H. Stemer; Ralph E. Locher

(57) ABSTRACT

A process and device separate off a volatile component from the off-gases in cement clinker production. Raw materials for cement clinker production are passed through a preheater with heat exchange with the off-gases and are then burnt in a rotary kiln. Owing to the heating in the preheater, the volatile component bound in the raw materials is vaporized and separated off. A first raw material stream having a relatively high concentration of the volatile component is applied to a first line of the preheater and a second raw material stream having a lower concentration of the volatile component is applied to a second line. The volatile component is separated off from the first substream of the off-gases. The first raw material stream heated to a temperature of at least 250° C. with the first substream of the off gases in the first line is combined with the second raw material stream.

18 Claims, 4 Drawing Sheets

(56) References Cited

U.S. PATENT DOCUMENTS

| | | | |
|---|---|---|---|
| 4,022,568 A * | 5/1977 | Meedom | B01J 6/002 106/771 |
| 4,695,325 A * | 9/1987 | Enkegaard | F27B 7/2025 106/751 |
| 4,932,862 A * | 6/1990 | Kettenbauer | B01J 8/1845 432/106 |
| 5,264,013 A | 11/1993 | Brentrup | |
| 5,292,247 A * | 3/1994 | Bauer | C04B 7/434 432/106 |
| 5,927,967 A | 7/1999 | Bauer et al. | |
| 7,799,297 B2 | 9/2010 | Saito | |
| 8,163,082 B2 * | 4/2012 | Hansen | C04B 7/365 106/739 |
| 2007/0248925 A1 * | 10/2007 | Dupuis | C04B 2/106 432/58 |
| 2009/0193968 A1 | 8/2009 | Jepsen et al. | |
| 2010/0230518 A1 * | 9/2010 | Ewles | B03B 9/061 241/23 |
| 2011/0041690 A1 * | 2/2011 | Jepsen | B01D 53/002 95/148 |
| 2011/0044880 A1 * | 2/2011 | Shima | C04B 7/367 423/437.1 |
| 2011/0318247 A1 * | 12/2011 | Fedi | C04B 7/364 423/235 |

FOREIGN PATENT DOCUMENTS

| | | |
|---|---|---|
| DE | 102008023899 A1 | 11/2009 |
| EP | 0519225 A1 | 12/1992 |
| EP | 0845443 A1 | 6/1998 |
| JP | 2008296077 A | 12/2008 |
| JP | 2009184902 A | 8/2009 |
| JP | 2009234869 A | 10/2009 |
| JP | 2009292691 A | 12/2009 |
| JP | 2010227900 A | 10/2010 |
| JP | 2011088770 A | 5/2011 |
| WO | 2005005025 A1 | 1/2005 |
| WO | 2007128619 A1 | 11/2007 |

* cited by examiner

PROCESS AND DEVICE FOR SEPARATING OFF A VOLATILE COMPONENT

BACKGROUND OF THE INVENTION

Field of the Invention

The invention relates to a process for separating off at least one volatile component, for example mercury, thallium, organic compounds, sulphur or nitrogen compounds, from the off-gases in cement clinker production, wherein the raw materials for cement clinker production are passed through a preheater with heat exchange with the off-gases and are then burnt in a rotary kiln, wherein, owing to the heating of the raw materials in the preheater, the volatile component bound in the raw materials is vaporised and separated off from the off-gases.

Furthermore, the invention relates to a device for separating off at least one volatile component, for example mercury, thallium, organic compounds, sulphur or nitrogen compounds, from the off-gases in cement clinker production, with a preheater, a feed for the raw materials required for cement clinker production in the counter-flow principle against the direction of the off-gases into the preheater, and with a rotary kiln for burning the raw materials.

Various raw materials, such as for example limestone and clay, are burnt in a rotary kiln in cement clinker production. Volatile components, such as mercury, thallium, organic compounds, sulphur or nitrogen compounds, are contained in many of the raw materials, which volatile components are vaporised during the heating in the preheating stage and are bound again to the dust during the cooling of the off-gases. For example, the major part of the mercury is thus fed back again to the cement clinker production process with the dust generated in the raw mill and separated off in the filter stage, only a small proportion escaping with the off-gases into the atmosphere. The mercury load is for the most part carried into the process via the raw materials, a small proportion of the mercury input being able to take place via the fuels.

The present patent application is directed primarily at cement clinker production, but can also be used with other thermal production processes in which a pronounced circulatory behaviour of some off-gas hazardous materials is observed.

In principle, the possibility exists of removing or reducing the mercury occurring in the raw materials before use for cement clinker production. This takes place, for example, by preparation of the raw materials with hot gases, as a result of which the contained mercury can be at least partially vaporised and then separated off in concentrated form. Due to the necessary heating of the raw materials, however, a relatively large amount of energy is required, which increases the overall costs and makes the process uneconomical with high material throughputs.

Solutions in which the entire off-gas stream of the rotary kiln in cement clinker production is cleaned with the aid of certain off-gas cleaning processes for separating off mercury, such as for example activated carbon filters, are also economically unacceptable due to the large air quantities and therefore the large plant size.

A further process for separating off mercury from the off-gases of a cement production process is known from EP 2 437 866 A1, wherein an expulsion reactor separate from the preheater is provided. The mercury is bound by a sorbent, in particular dust, and fed to the expulsion reactor operated with a carrier gas, where the sorbent is then heated to temperatures of more than 250° C., so that the mercury is expelled from the sorbent and transformed into the gaseous phase. The expulsion reactor gas enriched with mercury is then dedusted in a preliminary dust extraction system. In the expulsion reactor, only a substream of the gas thus enriched and dedusted is drawn off at high temperatures and cleaned in a subsequent sorption stage, whilst the remaining substream is brought in a heat transfer system to the temperature required for the expulsion of the mercury in the expulsion reactor and is fed again as a carrier gas to the expulsion reactor. A hot off-gas stream from the cement production process can be mixed with the partially circulating gas stream in the heat transfer system of the expulsion reactor.

The drawback with the arrangement of the expulsion reactor, however, is the fact that the dust arising in the preliminary dust extraction system is fed to a silo before the dust is fed back into the preheater. Renewed heating of the dust in the preheater is therefore required, which is disadvantageously accompanied by a high expenditure of energy.

WO 2007/128619 A1 reveals a different kind of device for producing cement clinker, wherein a preheater with four cyclone stages and a calciner with one cyclone are provided. In the embodiment according to FIG. 3, a second calciner is provided, which is connected to cyclone stages.

DE 10 2008 023 899 A1 discloses a different kind of plant with a first preheater for preheating a calcium-rich material component and with a second preheater for preheating a material component low in calcium, a calciner and a kiln for burning the calcined raw material to form cement clinker. The first preheater is connected to an off-gas line of the calciner, whilst the second preheater is connected to an off-gas line of the kiln.

EP 0 845 443 A1 deals with a different kind of process for removing sulphur dioxide from off-gases of a kiln system, wherein the raw meal to be fed to a preheater is fed from a raw material grinding plant and cooled cement clinker is ground in a cement grinding plant. At least one substream of the off-gases from the raw meal preheater is passed through the cement grinding plant and thereby sulphur dioxide from the off-gases is absorbed by the cement particles.

BRIEF SUMMARY OF THE INVENTION

The task of the present invention, therefore, is to create a process as mentioned above and a device as mentioned above for separating off mercury from the off-gases in cement clinker production, by means of which a sufficiently high reduction of mercury emissions is enabled, wherein as little additional energy as possible and a gas volume flow to be cleaned that is as small as possible are required and therefore the operation and installation are to be as cost-effective as possible.

With the process of the kind mentioned at the outset, this task is solved by the fact that a first raw material stream having a higher concentration of the volatile component is fed into a first line of the preheater and a second raw material stream having a lower concentration of the volatile component is fed into a second line of the preheater, wherein the first line of the preheater is operated with a first substream of the off-gases of the rotary kiln and the second line of the preheater is operated with a second substream of the off-gases of the rotary kiln, wherein the volatile component is separated off from the first substream of the off-gases passed through the first line of the preheater, wherein the first raw material stream heated to a temperature of at least 250° C. by heat exchange with the first substream of the off-gases in the first line of the preheater is combined, at an essentially constant temperature of at least 250° C., with the second raw material stream of the second line of the preheater.

According to the invention, therefore, the raw materials having the higher concentration of the volatile component are fed into the first line of the preheater and the raw materials having the lower concentration of the volatile component are fed into the second line of the preheater. For the separating-off of the volatile component, use is made solely of the first substream of the off-gases, with which the raw materials having the higher concentration of the volatile component are treated in the first line of the preheater. On account of the separate feed of raw materials having a higher and lower concentration of the volatile component into the first and respectively second line of the preheater, the separating-off of the volatile component from the first substream of the off-gases enriched with the volatile component can be arranged particularly efficiently, since only the raw materials having the a high hazardous material proportion are used for the off-gas cleaning. After the preparation of the first raw material stream with the aid of the first substream of the off-gases in the first line of the preheater, the first raw material stream is passed into the second line of the preheater and united with the second raw material stream. The raw materials are finally conveyed together in the direction of the kiln and burnt in the kiln. The first line of the preheater is connected to the second line of the preheater in such a way that the raw materials from the first line treated and prepared with the first substream of the off-gases are then combined, at an essentially constant temperature, i.e. without cooling of the raw material stream in an intermediate storage unit, with the raw materials from the second line. The temperature of the first raw material stream amounts here to at least 250° C., in particular between 300° C. and 500° C. Advantageously, the energy efficiency can thus be increased substantially compared to embodiments with a separate expulsion reactor, wherein the raw material stream used for separating off the hazardous material is temporarily stored before return into the preheater and is therefore cooled.

For the efficient separating-off of the volatile components from the off-gas stream, it is beneficial if the first raw material stream contains dust from the cement clinker production. The dust fed into the first line of the preheater originates in particular from a kiln filter, with which the off-gases are dedusted before exit into the atmosphere. In a preferred process, a large dust mass flow having a relatively small mercury concentration arises in the raw mill at higher temperatures and a small dust mass flow having a higher mercury concentration arises in the kiln filter, which latter dust mass flow is fed into the first line of the preheater.

For the efficiency of the process, it is advantageous if the first raw material stream contains a higher proportion of carbon compounds, sulphur compounds, for example pyrite, or ammonium compounds than the second raw material stream.

In the performance of the process according to the invention, provision is preferably made such that the first substream of the off-gases passed through the first line of the preheater is first dedusted and thereafter its volatile component is separated off, wherein the dust separated off from the first substream is returned into the second line of the preheater. The first substream of the off-gases is fed here to a hot gas dust extractor, to which a solids loading of for example less than 200 g/Nm³ (gram per normal cubic metre) is applied and which cleans the off-gas down to dust contents <1 g/Nm³. The dust fed in the first line of the preheater is thus advantageously fed back almost completely into the cement production process.

The efficiency of the separating-off of the volatile component can be further increased if the first line of the preheater is operated with a smaller off-gas quantity, preferably also with a higher loading with dust, than the second line of the preheater. A comparatively high concentration of the volatile component in the off-gases is thus produced in the first line of the preheater, so that the subsequent separating-off of the volatile component from the off-gases of the first substream can be carried out particularly efficiently.

The first raw material stream can preferably be passed successively through at least two cyclones of the first line of the preheater. The first raw material stream is thereby heated in the counter-flow principle with the first substream of the off-gases, as a result of which the volatile component is expelled and then separated off from the first substream of the off-gases, whilst the first raw material stream is conveyed in the direction of the kiln.

In order to achieve a structurally simpler and therefore more cost-effective design of the preheater, it is advantageous if the first raw material stream is fed into an ascending pipe, is mixed there with the first substream of the off-gases and is then fed into a cyclone. The first substream of the off-gases is conveyed, after the ascending pipe in the flow direction of the off-gases, into a hot gas dust extractor, with which a further proportion of the first raw material stream is separated off and returned into the preheater.

For the preparation of the first substream from which the volatile component is separated off, it is beneficial if the first substream of the off-gases is branched off of the off-gases from the second line of the preheater.

For the separating-off of medium-volatility to high-volatility components, in particular mercury or ammonium, it is advantageous if the first substream of the off-gases is branched off between two cyclones of the second line of the preheater, wherein the off-gas temperature preferably amounts to more than 600° C. According to a preferred embodiment, the second line of the preheater comprises four or five cyclones, wherein the branching-off of the first substream of the off-gases preferably takes place between the second and third cyclone, as viewed in the flow direction of the raw materials.

For the separating-off of low-volatility components, in particular organic compounds, it is beneficial if the first substream of the off-gases is branched off, viewed in the flow direction of the off-gases, directly before the feed for the second raw material stream, wherein the off-gas temperature preferably amounts to between 450° C. and 500° C.

If the first substream of the off-gases is branched off at an off-gas temperature of between 750° C. and 800° C. from the second substream of the off-gases, high-volatility components, for example sulphur compounds, can on the one hand be expelled and separated off efficiently from the first raw material stream. Moreover, the efficiency of the off-gas cleaning can be increased, since a correspondingly higher throughput of the first raw material stream can be achieved with the same off-gas quantity in the first line of the preheater.

In order to increase the throughput of the first raw material stream and to improve the energy efficiency of the off-gas cleaning, it is beneficial if a proportion of the first substream is fed back before the separating-off of the volatile component, as viewed in the flow direction of the off-gases, into the first line of the preheater. A proportion of the first substream of the off-gases is accordingly recycled in the manner of a recirculated air function into the first line of the preheater. Between 50 and 90% of the off-gases of the first substream is preferably fed back into the first line of the preheater, so that correspondingly only between 50% and 10% of the off-gases of the first substream is drawn off from the preheater and used for separating off the volatile component.

It is advantageous if the temperature of the off-gases of the substream is reduced before the separating-off of the volatile component. The reduction in temperature can take place for example in a quench by injecting water. The reduction in temperature can also be combined simultaneously with the separating-off of the volatile component. Heat exchangers or evaporation coolers are particularly suitable for reducing the temperature to 60° C. to 140° C., preferably 60° C. to 120° C. As a result of the reduced vapour pressure, the separating-off of the mercury in the at least one filter stage can be increased.

According to a first preferred embodiment, the volatile component, in particular mercury, is separated off with the aid of a bag filter from the off-gases of the first substream. The volatile component, which is originally present for the most part in gaseous form, is condensed by corresponding temperature reduction, so that the particles that have arisen can be separated off from the filter material of the bag filter. The particles with the volatile component bound therein are removed from the bag filter and disposed of at regular intervals. Additional additives, such as activated carbon, are preferably introduced in order to separate the mercury from the gaseous phase and to separate it off from the off-gases of the first substream.

As an alternative to the bag filter, the volatile component, in particular mercury, can be separated off with the aid of a scrubber from the off-gases of the first substream. As a scrubbing liquid, use can be made in particular of metal sulphide solutions, limestone suspensions or acid scrubbers in combination with organosulphide precipitation agents, so that the volatile component is concentrated after a treatment of the waste water of the scrubber. Especially when the separated-off volatile component has to be disposed of, it is advantageous if the latter is concentrated to a suitably high degree by the separating-off process.

As an alternative to the methods described above, the volatile component, in particular mercury, can be separated off with the aid of a fixed-bed or moving-bed adsorber from the off-gases of the first substream. Higher degrees of separation can in principle be achieved with a moving-bed adsorber and the use of the employed sorption agent is higher than in the case of entrainer flow processes.

According to a further alternative embodiment, the volatile component, in particular ammonia, can be separated off with the aid of a selective catalytic reactor.

Finally, the volatile component, in particular organic compounds, can be separated off with the aid of a thermal after-burning facility.

The task underlying the invention is also solved by a device of the type mentioned at the outset, wherein the preheater comprises a first line that can be operated with a first substream of off-gases and a second line that can be operated with a second substream of off-gases, wherein the first line of the preheater comprises a first feed for a first raw material stream having a high concentration of the volatile component and the second line of the preheater comprises a second feed for a second raw material stream having a lower concentration of the volatile component, wherein the first line of the preheater is connected to a stage for separating off the volatile component from the first substream of the off-gases, wherein a connecting line is disposed between the first and second line of the preheater, so that the first raw material stream heated to a temperature of at least 250° C. by heat exchange with the first substream of the off-gases in the first line of the preheater can be combined, at an essentially constant temperature of at least 250° C., with the second raw material stream of the second line of the preheater.

Regarding the advantages of the device according to the invention, reference is made to the above description of the process.

For the treatment of raw materials having a higher concentration of the volatile component in the first line of the preheater, it is advantageous if the feed for the first raw material stream is connected to a dust storage unit for storing dust, preferably filter dust from a kiln filter for dedusting the off-gases before exit into the atmosphere.

In order to apply raw materials having a lower concentration of the volatile component to the second line of the preheater in a targeted manner, it is beneficial if the feed for the second raw material stream is connected to a raw meal storage unit for storing raw meal from a raw meal mill.

The efficiency of the off-gas cleaning can be increased considerably if the dust storage unit is disposed separate from the raw meal storage unit. Accordingly, the raw materials differing in respect of the concentration of the volatile component are stored and fed into the respective line of the preheater separate from one another.

With regard to an energy-efficient operation, it is advantageous if the first line of the preheater comprises a hot gas dust extractor for dedusting the off-gases of the first substream, which hot gas dust extractor is connected to the second line of the preheater via the line returning the separated-off dust.

For the concentration of the volatile component in the first substream of the off-gases, it is advantageous if a circulation line for returning a proportion of the first substream of the off-gases into the first line of the preheater is provided, viewed in the flow direction of the off-gases, before the stage for separating off the volatile component.

For the operation of the first line of the preheater, a line for branching off the first substream of the off-gases from the second substream of the off-gases is preferably provided between the first and second line of the preheater. The off-gases for operating the first line of the preheater are thus obtained from the second substream of the off-gases in the second line of the preheater.

Various separators known per se in the prior art can be used depending on the nature of the volatile component.

The stage for separating off the volatile component in the first substream of the off-gases can comprise a bag filter. On the other hand, the stage for separating off the volatile component in the first substream of the off-gases can comprise a scrubber. Further advantageous embodiments provide a fixed-bed or moving-bed adsorber for separating off the volatile component in the first substream of the off-gases. In addition, the stage for separating off the volatile component in the first substream of the off-gases can comprise a selective catalytic reactor. Finally, it is advantageous in many cases if the stage for separating off the volatile component in the first substream of the off-gases comprises a thermal after-burning facility.

The present invention is explained in greater detail with the aid of the appended drawings.

DESCRIPTION OF THE INVENTION

Figure 1:
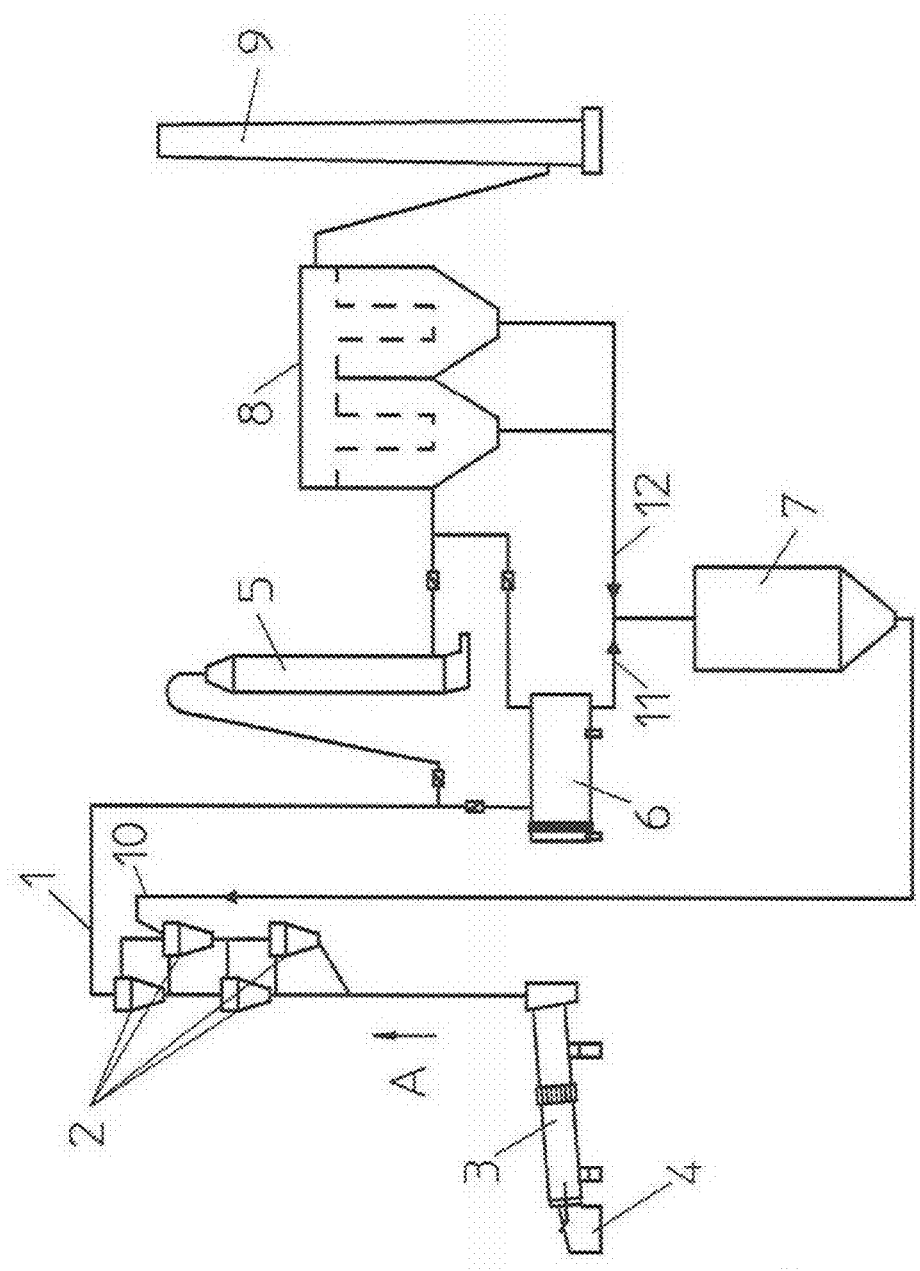
FIG. 1 shows a block diagram of a device for cement clinker production according to the prior art.

FIG. 1 shows a block diagram of a device for cement clinker production according to the prior art. Raw material 10 required for the cement clinker production is fed in the counter-flow principle, i.e. against direction A of off-gases 1, into a preheater 2, which usually comprises a plurality of cyclones disposed above one another. Raw material 10 suitably preheated passes from preheater 2 into rotary kiln 3, where the material is burnt to form cement clinker. The cement clinker is removed via a corresponding cooling and removal device 4 and conveyed into corresponding silos (not represented). Before exit of the off-gases into the atmosphere, the latter are fed at least in part for meal drying in a raw meal mill 6 or are cooled in a cooling device 5, such as for example an evaporation cooler, and dedusted in a kiln filter 8. Off-gases 1 then pass via a chimney 9 into the atmosphere. Separated-off dust 12 from kiln filter 8 and ground raw material 11 from the raw meal mill 6 are mixed in a silo 7 and fed together as raw material 10 into preheater 2. As a result of the nature of the counter-flow of material and off-gas, a circuit for the mercury contained in off-gases 1 is created between preheater 2 and raw mill 6 or the at least one filter stage 8 due to the material feedback. The mercury mass flow, which is conveyed in the circuit, amounts to a multiple of the mercury input mass flow from the fresh raw materials and fuels.

Figure 2:
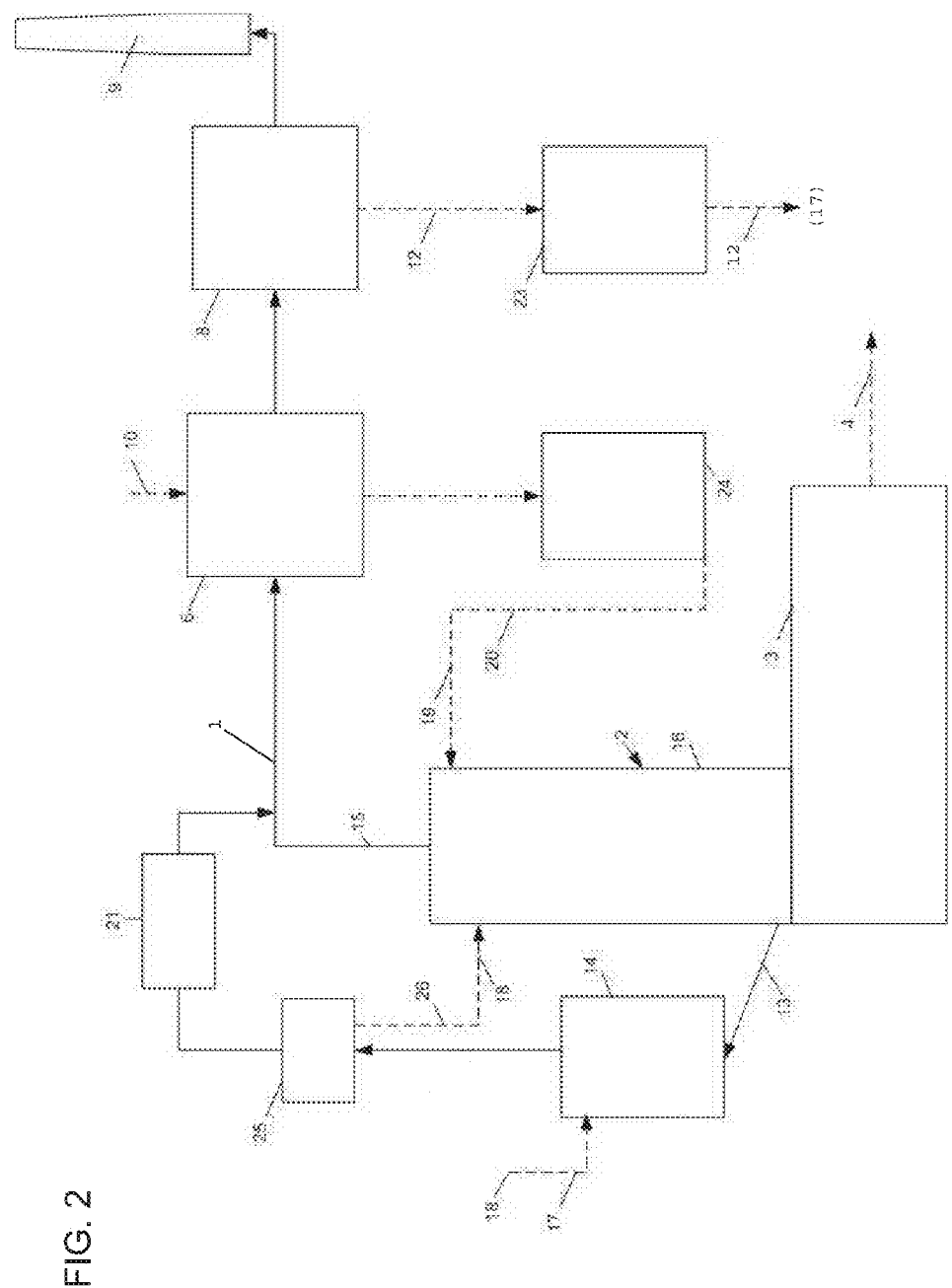
FIG. 2 shows a block diagram of a device according to the invention for separating off volatile components in cement clinker production.

FIG. 2 shows the block diagram of an embodiment according to the invention of a process and a device for separating off the volatile component, in particular mercury in the shown embodiment, from the off-gases in cement clinker production. The off-gas streams are indicated here by continuous lines and the material streams by dashed lines.

As can be seen from FIG. 2, preheater 2 of the shown plant comprises a first line 14 that can be operated with a first substream 13 of the off-gases and a second line 16 that can be operated with a second substream 15 of off-gases 1. A first raw material stream 18 having a higher concentration of the volatile component is applied via a feed 17 to the first line 14. A second raw material stream 20, which has a lower concentration of the volatile component, is applied via feed 19 to second line 16. The raw materials for the cement clinker production are passed, with heat exchange with off-gases 1, through preheater 2 and then burnt in rotary kiln 3. The volatile component bound in the raw materials is vaporised by the heating of the raw materials in preheater 2. First raw material stream 18 in first line 14 of the preheater is heated for this purpose by off-gases 1 to a temperature of at least 250° C., which suffices to expel the mercury.

As can also be seen from FIG. 2, a connecting line 26 is disposed between first line 14 and second line 16 of preheater 2. First raw material stream 18 in first line 14 of preheater 2, which has a temperature of at least 250° C. due to the contact with first substream 13 of off-gases 1, is conveyed via connecting line 26 directly, i.e. without intermediate storage, into second line 16 of preheater 2, so that the temperature of first raw material stream 18 does not change or changes only insignificantly during transport into second line 16. First raw material stream 18 is thus combined, at an essentially constant temperature of at least 250° C., with second raw material stream 20 of second line 16 of preheater 2. Renewed heating of first raw material stream 18, from which the volatile component is separated off, can thus be dispensed with, so that the energy efficiency of the process can be increased.

As can also be seen from FIG. 2, feed 17 for first raw material stream 18 is connected to a dust storage unit 23 for storing dust which contains a relatively high proportion of the volatile component. Dust storage unit 23 is connected to kiln filter 8 for dedusting the off-gases before exit into the atmosphere. Dust 12 arising in kiln filter 8 is thus conveyed via dust storage unit 23 to feed 17, with which first raw material stream 18 is fed in the form of dust 12 into first line 14 of preheater 2. On the other hand, feed 19 for second raw material stream 20 is connected to a raw meal storage unit 24 for storing raw meal which is obtained at raw meal mill 6 from raw materials 10, said raw meal storage unit 24 being separate from dust storage unit 23. In the shown plant, therefore, a separation of the raw materials into first raw material stream 18 having the higher concentration of the volatile component and into second raw material stream 20 having the lower concentration of the volatile component is carried out.

Figure 3:
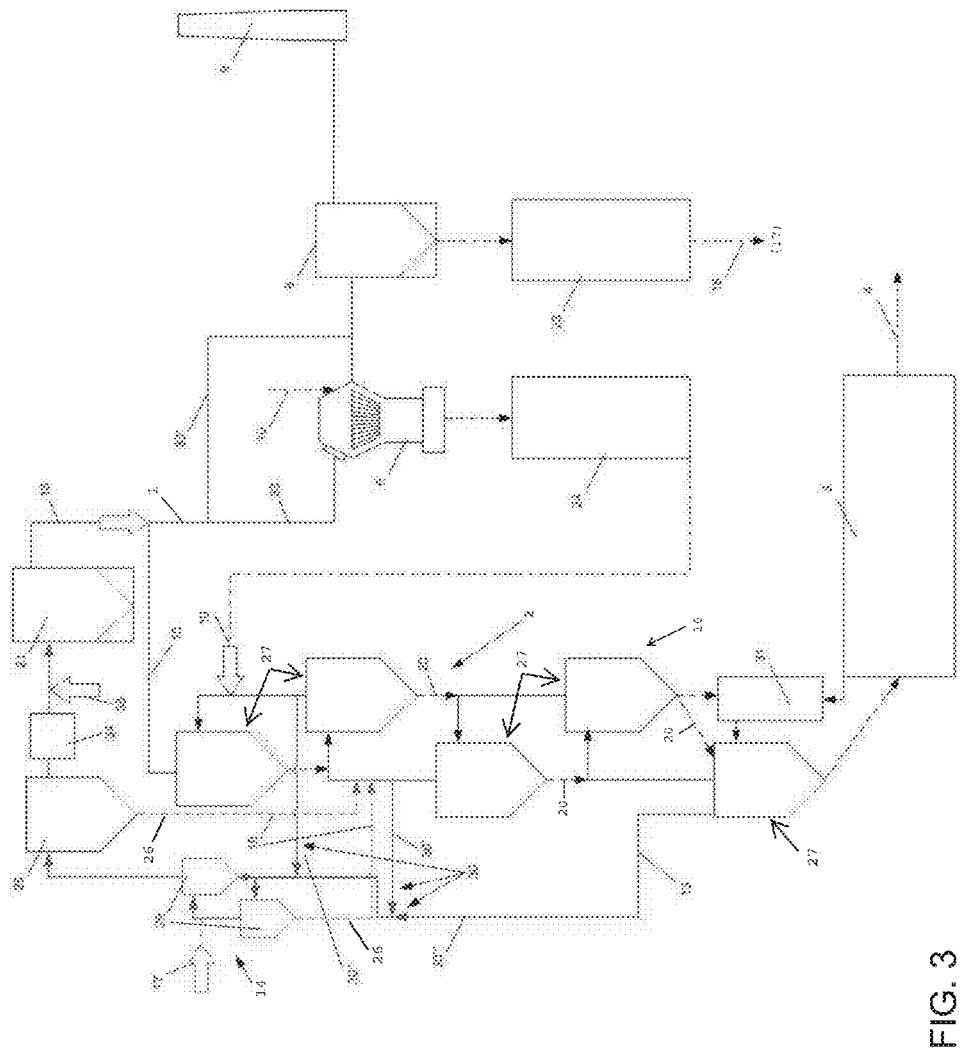
FIG. 3 shows a block diagram of a further embodiment of the device for separating off volatile components.

FIG. 3 shows a block diagram of a further embodiment of the device according to the invention.

As can be seen from FIG. 3, second line 16 of preheater 2 in the shown embodiment comprises five cyclones 27. Second raw material stream 20 (represented by dashed lines in FIG. 3) is passed in the counter-flow principle to second substream 15 of off-gases 1 (represented in FIG. 3 by continuous lines) through cyclones 27 of second line 16.

As can also be seen from FIG. 3, first line 14 of preheater 2 in the shown embodiment comprises a two-stage cyclone cascade 29, which is connected to feed 17 and in which first raw material stream 18 is mixed with first substream 13 of off-gases 1 and then conveyed in the direction of hot gas dust extractor 25, with which off-gases 1 are dedusted. Hot gas dust extractor 25 is connected via line 26, for the return of the separated-off dust, to second line 16 of preheater 2.

As can also be seen from FIG. 3, at least one line 30 for branching off first substream 13 of off-gases 1 from second substream 15 of off-gases 1 is provided between first line 14 and second line 16 of preheater 2.

Represented in FIG. 3 are three different lines 30', 30", 30''' for branching off first substream 13 of off-gases 1 from second line 16 of preheater 2, wherein it is of course also possible for only one of the shown variants to be used.

As can be seen from FIG. 3, line 30' emerges between two cyclones 27 into second line 16 of preheater 2. The off-gas temperature essentially amounts here to 600° C.

On the other hand, first substream 13 of off-gases 1 can be branched off via line 30" which emerges directly into second line 16 of the preheater, viewed in the flow direction of the off-gases, before feed 19 for second raw material stream 20. The off-gas temperature amounts here to between 450° C. and 500° C.

Finally, first substream 13 of off-gases 1 can be branched off at an off-gas temperature of between 750° C. and 800° C. from second substream 15 of off-gases 1. For this purpose, line 30''' in the shown embodiment is connected to fifth cyclone 27, as viewed in the direction of the material flow. Alternatively, line 30''' can also depart from second line 16 of preheater 2 in the region of a calciner 31 or of the fourth cyclone 27 (not shown).

As can also be seen from FIG. 3, first line 14 of preheater 2 is connected to a stage 21 for separating off the volatile component (or difference volatile components) from first substream 13 of off-gases 1, said stage comprising for example a bag filter. A cooler 34 for cooling first substream 13 to a temperature of for example 120° C. is also disposed in front of stage 21. A sorption agent 35, for example activated carbon or metal sulphide solutions, is fed to first substream 13, after flowing through cooler 34, before the volatile component is separated off in separating-off stage 21. The hazardous materials separated off at separating-off stage 21 are removed from the system via a line (not shown). The volatile component is thus separated off from first substream 13 of off-gases 1 passed through first line 14 of preheater 2, which substream had previously been enriched with the volatile component from first raw material stream 18. The volatile components are contained in high concentrations in first substream 13 of off-gases 1, as a result of which the efficiency of the off-gas cleaning can be increased considerably in following stage 21. For a further increase in efficiency, first line 14 of preheater 2 is operated with a smaller off-gas quantity than second line 16 of the preheater. Moreover, first substream 13 of off-gases 1 is combined, in the flow direction after stage 21 for separating off the volatile component, via a line 33 with second substream 15 of the off-gases. Off-gases 1 can then be fed to raw meal mill 6. In the direct operation, off-gases 1 are fed via line 33' directly to kiln filter 8 after the combination of substreams 13, 15.

Figure 4:
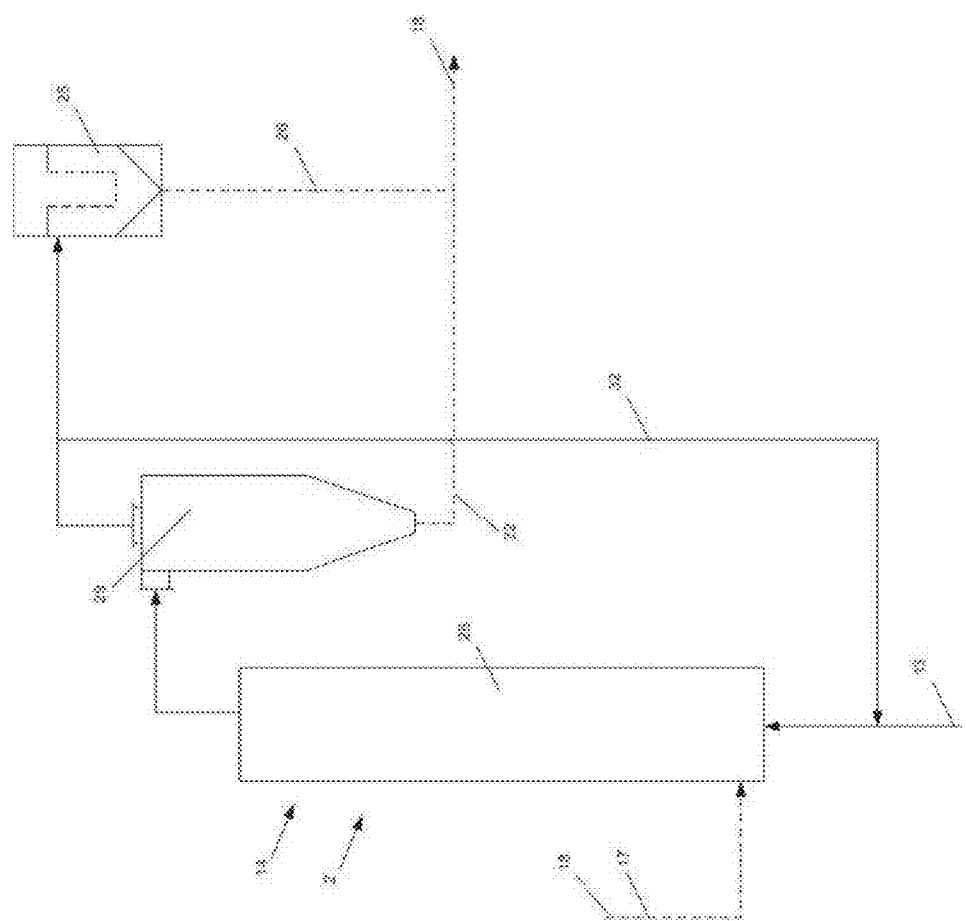
FIG. 4 shows a block diagram of a first preheater line of the device according to FIG. 3.

FIG. 4 shows a preferred embodiment of the device, wherein a proportion of first substream 13 is fed back into first line 14 of preheater 2 between first line 14 of preheater 2 and hot gas dust extractor 25. For this purpose, a circulation line 32 is provided with which a proportion of first substream 13 of off-gases 1 is branched off, in the flow direction, after cyclone 29 and recycled, in the flow direction, before ascending pipe 28 into first line 14 of preheater 2. A proportion of first substream 13 of off-gases 1 thus circulates in first line 14 of preheater 2, whilst the remaining proportion of first substream 13 is conveyed to stage 21, with which the volatile component is separated off.

The invention claimed is:

1. A process for separating off at least one volatile component from off-gases in cement clinker production, which comprises the steps of:
   passing raw materials for the cement clinker production through a preheater with heat exchange with the off-gases and the raw materials being then burnt in a rotary kiln, wherein, owing to a heating of the raw materials in the preheater, the volatile component bound in the raw materials is vaporized and separated off from the off-gases, the passing step containing the further following steps of:
   feeding a first raw material stream having a higher concentration of the volatile component into a first line of the preheater, wherein the first line of the preheater being operated with a first substream of the off-gases of the rotary kiln;
   feeding a second raw material stream having a lower concentration of the volatile component than in the first raw material stream into a second line of the preheater, the second line of the preheater being operated with a second substream of the off-gases of the rotary kiln;
   dedusting the first substream of the off-gases passed through the first line of the preheater, wherein dust separated off from the first substream is returned into the second line of the preheater;
   after performing the dedusting step, separating off the volatile component from the first substream of the off-gases passed through the first line of the preheater; and
   combining the first raw material stream heated to a temperature of at least 250° C. by heat exchange with the first substream of the off-gases in the first line of the preheater, at a generally constant temperature of at least 250° C., with the second raw material stream of the second line of the preheater.

2. The process according to claim 1, wherein the first raw material stream contains the dust from the cement clinker production.

3. The process according to claim 1, wherein the first raw material stream contains a higher proportion of carbon compounds, sulphur compounds, or ammonium compounds than the second raw material stream.

4. The process according to claim 1, which further comprises operating the first line of the preheater with a smaller off-gas quantity, having a higher loading with the dust, than the second line of the preheater.

5. The process according to claim 1, which further comprises passing successively the first raw material stream through at least two cyclones of the first line of the preheater.

6. The process according to claim 1, which further comprises feeding the first raw material stream into an ascending pipe, is mixed there with the first substream of the off-gases and is then fed into a cyclone.

7. The process according to claim 1, which further comprises branching off the first substream of the off-gases from the off-gases of the second line of the preheater.

8. The process according to claim 7, which further comprises branching off the first substream of the off-gases at an off-gas temperature of between 750° C. and 800° C. from the second substream of the off-gases.

9. The process according to claim 1, which further comprises feeding back a proportion of the first substream before the separating off of the volatile component, as viewed in a flow direction of the off-gases, into the first line of the preheater.

10. The process according to claim 1, which further comprises reducing a temperature of the off-gases of the first substream before the separating off of the volatile component.

11. The process according to claim 1, which further comprises performing the separating off of the volatile component, namely mercury, with an aid of a bag filter from the off-gases of the first substream.

12. The process according to claim 1, which further comprises performing the separating off of the volatile component, namely mercury, with an aid of a scrubber from the off-gases of the first substream.

13. The process according to claim 1, which further comprises performing the separating off of the volatile component, namely mercury, with an aid of a fixed-bed adsorber or a moving-bed adsorber from the off-gases of the first substream.

14. The process according to claim 1, which further comprises performing the separating off of the volatile component, namely ammonia, with an aid of a selective catalytic reactor.

15. The process according to claim 1, which further comprises performing the separating off of the volatile component, namely organic compounds, with an aid of a thermal after-burning facility.

16. The process according to claim 1, which further comprises selecting the at least one volatile component from the group consisting of mercury, thallium, organic compounds, sulphur and nitrogen compounds.

17. A process for separating off at least one volatile component from off-gases in cement clinker production, which comprises the steps of:
   passing raw materials for the cement clinker production through a preheater with heat exchange with the off-gases and the raw materials being then burnt in a rotary kiln, wherein, owing to a heating of the raw materials in the preheater, the volatile component bound in the raw materials is vaporized and separated off from the off-gases, the passing step containing the further following steps of:
      feeding a first raw material stream having a higher concentration of the volatile component into a first line of the preheater, wherein the first line of the preheater being operated with a first substream of the off-gases of the rotary kiln;
      feeding a second raw material stream having a lower concentration of the volatile component than in the first raw material stream into a second line of the preheater, the second line of the preheater being operated with a second substream of the off-gases of the rotary kiln;
      branching off the first substream of the off-gases from the off-gases of the second line of the preheater by branching off the first substream of the off-gases between two cyclones of the second line of the preheater, wherein an off-gas temperature amounts to more than 600° C.;
      separating off the volatile component from the first substream of the off-gases passed through the first line of the preheater; and
      combining the first raw material stream heated to a temperature of at least 250° C. by heat exchange with the first substream of the off-gases in the first line of the preheater, at a generally constant temperature of at least 250° C., with the second raw material stream of the second line of the preheater.

18. A process for separating off at least one volatile component from off-gases in cement clinker production, which comprises the steps of:
   passing raw materials for the cement clinker production through a preheater with heat exchange with the off-gases and the raw materials being then burnt in a rotary kiln, wherein, owing to a heating of the raw materials in the preheater, the volatile component bound in the raw materials is vaporized and separated off from the off-gases, the passing step containing the further following steps of:
      feeding a first raw material stream having a higher concentration of the volatile component into a first line of the preheater, wherein the first line of the preheater being operated with a first substream of the off-gases of the rotary kiln;
      feeding a second raw material stream having a lower concentration of the volatile component than in the first raw material stream into a second line of the preheater, the second line of the preheater being operated with a second substream of the off-gases of the rotary kiln;
      branching off the first substream of the off-gases from the off-gases of the second line of the preheater by branching off the first substream of the off-gases, viewed in a flow direction of the off-gases, directly before a feed for the second raw material stream, wherein an off-gases temperature is between 450° C. and 500° C.;
      separating off the volatile component from the first substream of the off-gases passed through the first line of the preheater; and
      combining the first raw material stream heated to a temperature of at least 250° C. by heat exchange with the first substream of the off-gases in the first line of the preheater, at a generally constant temperature of at least 250° C., with the second raw material stream of the second line of the preheater.

* * * * *